(12) United States Patent
Waszak et al.

(10) Patent No.: US 8,162,267 B2
(45) Date of Patent: Apr. 24, 2012

(54) BARB SUPPORT

(75) Inventors: Dennis J. Waszak, Wheaton, IL (US); Robert Nicoli, Glenwood, IL (US)

(73) Assignee: Panduit Corp., Tinley Park, IL (US)

( * ) Notice: Subject to any disclaimer, the term of this patent is extended or adjusted under 35 U.S.C. 154(b) by 1275 days.

(21) Appl. No.: 10/970,566

(22) Filed: Oct. 21, 2004

(65) Prior Publication Data

US 2005/0098687 A1 May 12, 2005

Related U.S. Application Data

(60) Provisional application No. 60/513,121, filed on Oct. 21, 2003.

(51) Int. Cl.
*F16L 3/22* (2006.01)

(52) U.S. Cl. ........... 248/68.1; 403/387; 403/122; 52/11; 52/220.5

(58) Field of Classification Search .................. 248/68.1, 248/48.1, 49; 403/387, 300, 375, 341, 302, 403/309, 363, 402, 122; 52/11, 220.5
See application file for complete search history.

(56) References Cited

U.S. PATENT DOCUMENTS

| | | | |
|---|---|---|---|
| 834,828 A | 10/1906 | Lutz | |
| 917,328 A | 4/1909 | Lutz | |
| 1,087,791 A | 2/1914 | Leavitt | |
| D49,688 S | 9/1916 | Abbott | |
| D49,694 S | 9/1916 | Abbott | |
| D52,954 S | 2/1919 | Hubbard et al. | |
| 1,590,569 A | 6/1926 | Fisk | |
| 1,682,840 A | 9/1928 | Foerch, Jr. | |
| 1,862,433 A | 6/1932 | Ross | |
| 2,316,166 A | 4/1943 | Huguelet | 138/75 |
| 2,682,321 A | 6/1954 | Brock | 189/36 |
| 2,821,154 A | 1/1958 | Tennison | 108/28 |
| 2,823,056 A | 2/1958 | Di Meo | 287/103 |
| 2,829,190 A | 4/1958 | Comlossy | 174/47 |
| 2,834,622 A | 5/1958 | Reeves | 287/62 |
| D184,913 S | 4/1959 | Cataldo et al. | D26/5 |
| 3,023,032 A | 2/1962 | Johnston et al. | 285/156 |
| 3,042,351 A | 7/1962 | Du Bois | 248/49 |
| 3,272,537 A | 9/1966 | Stone et al. | 285/187 |
| 3,275,355 A | 9/1966 | Endler et al. | 287/189.36 |

(Continued)

FOREIGN PATENT DOCUMENTS

DE 526367 6/1931

(Continued)

OTHER PUBLICATIONS

Emerson, Aim Electronics, Category 5 & Fiber Optic Duct Raceway Fitting, 2 pages.

(Continued)

*Primary Examiner* — Kimberly Wood
(74) *Attorney, Agent, or Firm* — Robert A. McCann; Christopher S. Clancy

(57) ABSTRACT

The embodiments provide a barb assembly for use with a cable duct component to oppose removal of a cable duct section from the cable duct component. The barb assembly and/or cable duct component can comprise one or more barb arm supports, which can increase the ability of the barb assembly to oppose removal of the cable duct section from the cable duct component. The embodiments also provide methods of installing cable duct components and systems with the above-described features.

16 Claims, 3 Drawing Sheets

U.S. PATENT DOCUMENTS

| | | | | |
|---|---|---|---|---|
| 3,351,699 | A | 11/1967 | Merckle | 174/35 |
| 3,370,121 | A | 2/1968 | Merckle | 174/35 |
| 3,401,721 | A | 9/1968 | George | 138/92 |
| 3,425,456 | A | 2/1969 | Schibig | 138/162 |
| 3,451,033 | A | 6/1969 | Flachbarth | 339/14 |
| 3,457,598 | A | 7/1969 | Mariani | 24/16 |
| 3,471,629 | A | 10/1969 | O'Leary | 174/49 |
| 3,570,546 | A | 3/1971 | Jackson | 138/155 |
| 3,600,010 | A | 8/1971 | Downs, III et al. | 285/96 |
| 3,633,628 | A | 1/1972 | Duquette et al. | 138/116 |
| 3,841,101 | A | 10/1974 | Henfrey | 61/14 |
| 3,875,618 | A | 4/1975 | Schuplin | 24/16 |
| 3,906,146 | A | 9/1975 | Taylor | 174/72 |
| 3,931,946 | A | 1/1976 | Soltysik | 248/68 |
| 3,938,767 | A | 2/1976 | Norris | 248/58 |
| 4,099,749 | A | 7/1978 | Van Vliet | 285/398 |
| 4,105,051 | A | 8/1978 | Visentin | 138/162 |
| 4,163,572 | A | 8/1979 | Benscoter | 285/121 |
| 4,202,090 | A | 5/1980 | Cook | 29/417 |
| 4,270,020 | A | 5/1981 | Kenworthy et al. | 174/48 |
| 4,305,236 | A | 12/1981 | Williams | 52/11 |
| 4,306,109 | A | 12/1981 | Nattel | 174/51 |
| 4,398,564 | A | 8/1983 | Young et al. | 138/92 |
| 4,602,124 | A | 7/1986 | Santucci | 174/101 |
| 4,627,469 | A | 12/1986 | Buard | 138/92 |
| 4,931,597 | A | 6/1990 | Kimbrough et al. | 174/48 |
| 4,954,015 | A | 9/1990 | McGowan | 405/121 |
| 5,035,092 | A | 7/1991 | Brant | 52/11 |
| 5,038,528 | A | 8/1991 | Brant | 52/11 |
| D320,782 | S | 10/1991 | Henneberger | D13/155 |
| D321,682 | S | 11/1991 | Henneberger | D13/155 |
| 5,067,678 | A | 11/1991 | Henneberger et al. | 248/68.1 |
| 5,100,221 | A | 3/1992 | Carney et al. | 385/135 |
| D327,874 | S | 7/1992 | Henneberger | D13/155 |
| 5,161,580 | A | 11/1992 | Klug | 138/92 |
| D334,380 | S | 3/1993 | Henneberger | D13/155 |
| 5,271,585 | A | 12/1993 | Zetena, Jr. | 248/49 |
| 5,271,586 | A | 12/1993 | Schmidt | 248/58 |
| D347,209 | S | 5/1994 | Henneberger | D13/155 |
| 5,316,243 | A | 5/1994 | Henneberger | 248/68.1 |
| 5,316,244 | A | 5/1994 | Zetena, Jr. | 248/49 |
| 5,391,840 | A | 2/1995 | Hughes et al. | 174/68.3 |
| 5,522,675 | A | 6/1996 | Gunter | 405/118 |
| 5,735,637 | A | 4/1998 | Gunter | 405/118 |
| 5,752,781 | A | 5/1998 | Haataja et al. | 403/387 |
| 5,872,336 | A | 2/1999 | Long | 174/135 |
| 6,192,181 | B1 | 2/2001 | Haataja et al. | 385/136 |
| 6,450,458 | B1 | 9/2002 | Bernard | 248/68.1 |
| 6,523,791 | B2 | 2/2003 | Bernard | 248/68.1 |
| 6,559,378 | B1 | 5/2003 | Bernard | 174/48 |
| 6,634,605 | B2 | 10/2003 | Bernard et al. | 248/68.1 |
| 6,709,186 | B2 * | 3/2004 | Ferris et al. | 403/293 |
| 7,093,997 | B2 * | 8/2006 | Ferris et al. | 403/293 |
| 2003/0085327 | A1 | 5/2003 | Bernard et al. | 248/68.1 |
| 2004/0051007 | A1 * | 3/2004 | Bernard et al. | 248/68.1 |

FOREIGN PATENT DOCUMENTS

| | | | | |
|---|---|---|---|---|
| DE | 27 06 191 | A | 8/1978 | |
| DE | 31 14 225 | | 11/1982 | |
| DE | 33 46 211 | | 6/1985 | |
| DE | 36 36 412 | | 4/1988 | |
| DE | 3636412 | A1 | 4/1988 | |
| DE | 38 04 542 | A1 | 9/1989 | |
| DE | 41 20 937 | A1 | 3/1992 | |
| DE | 3 879 353 | | 4/1993 | |
| DE | 200 22 356 | U | 12/2001 | |
| EP | 0 315 023 | A2 | 5/1989 | |
| EP | 0 348 285 | A1 | 12/1989 | |
| EP | 0 798 581 | A1 | 10/1997 | |
| EP | 1 049 226 | A | 11/2000 | |
| EP | 1160950 | A2 * | 12/2001 | |
| FR | 1 100 982 | | 9/1955 | 12/6 |
| FR | 1.138.599 | | 6/1957 | |
| FR | 1207610 | | 6/1958 | |
| FR | 2 343 393 | | 9/1977 | |
| FR | 2 365 902 | | 4/1978 | |
| FR | 2 488 064 | | 2/1982 | |
| FR | 2 488 742 | | 2/1982 | |
| FR | 2 680 206 | | 2/1993 | |
| FR | 2 686 141 | | 7/1993 | |
| GB | 518208 | | 2/1940 | |
| GB | 549 840 | | 12/1942 | |
| GB | 612162 | | 11/1948 | |
| GB | 956898 | | 4/1964 | |
| GB | 1 124 370 | | 8/1968 | |
| GB | 1 342 085 | | 12/1973 | |
| JP | 5-130726 | | 5/1993 | |
| NL | 288545 | | 3/1964 | |
| SU | 920930 | | 4/1982 | |
| WO | WO 00/75550 | A1 | 12/2000 | |

OTHER PUBLICATIONS

Networking and Protecting, PrŌ-Duct Wiring Duct, http://www.hellermann.tyton.com, pp. 66-77.

SnapMark™ SMS2100 Series, Steel Raceways, Fittings, Connectors & Boxes . . . , 5 pages.

Standard Search Report from European Patent Office, File No. RS 107377 US, completed Sep. 14, 2001, 4 pages.

Standard Search Report from European Patent Office, File No. RS 107376 US, completed Sep. 11, 2001, 4 pages.

Tyco Electronics, LIGHTRAX, DITEL, Fiber Optic Raceway Systems, 2 pages.

Tyco Electronics, RAYDUCT, Raychem, FIST Fiber Ducting Systems, 2 pages.

WIREMOLD®, Walker® Infloor Systems, Flushduct® and Components, Flushduct Raceway, Fittings and Activations, ED763R1 updated Dec. 2000, 6 pages, www.wiremold.com.

WIREMOLD®, Walker® Infloor Systems, Steel Wallduct, Vertical and Horizontal Wiring Feed Solutions, ED737R1 updated Jan. 2001, 8 pages, www.wiremold.com.

WIREMOLD®, Wire Management Systems, CXN Profile™ Series Raceway, Highly Aesthetic Surface Nonmetallic Raceway System, ED940R2 updated Jan. 2001, 6 pages, www.wiremold.com.

* cited by examiner

BARB SUPPORT

RELATED APPLICATIONS

This application claims the benefit of U.S. Provisional Application 60/513,121, filed Oct. 21, 2003, the entirety of which is incorporated herein by reference.

BACKGROUND

1. Field of the Invention

The present invention relates to the field of duct-type cable routing systems. More specifically, the invention relates to fittings that include barb assemblies that can bitingly engage an end of a cable duct section and oppose removal of the cable duct section from the cable duct component.

2. Background

Raceway duct systems have become very popular in recent years to route, protect, and conceal data, voice, video, fiber optic, and/or power cabling. Such systems allow custom installation and can be provided within walls or provided on external surfaces, allowing ready access for reconfiguration, repair, or installation of additional equipment. Such systems may typically include various sections of duct or raceway, including straight sections and various fittings, such as 90° elbow fittings, 45° elbow fittings, T-fittings, four-way intersection (x) fittings, and the like, respective ones of which are affixed together by duct couplers to cumulatively form a duct system.

U.S. Pat. Nos. 6,634,605, 6,523,791, 6,450,458, and 6,559,378 provide examples and descriptions of the general background of cable duct couplers and other cable duct fittings, and the entirety of these applications are incorporated herein by reference as though set forth here in full. U.S. Pat. No. 5,316,243 (assigned to ADC Telecommunications, Inc.) provides a description of the general background and environment of cable routing systems, and the specification of that issued patent is incorporated herein by reference as though set forth here in full.

Due to the increase in the number and sophistication of such raceway duct systems, the number of duct couplers and fittings being installed in such systems has also increased significantly. Therefore, it is important to have couplers and fittings that are easy to install and inexpensive to manufacture, and that provide relatively high resistance to "pullout" forces to prevent unintended disassembly.

Previous designs disclosed cable duct components with barb assemblies that could bitingly engage another component of a cable duct system, such as a section of cable duct or raceway. Through such engagement, the barb could resist a tensile "pullout" force applied to the other cable duct component, and the barb could oppose removal of that component. There are limits, however, to the pullout force that the barb can resist. Although previous designs were improvements over the prior art, it would be a further improvement to provide a product that could resist a larger pullout force. Significantly, the present invention increases the ability of a barb to resist a tensile pullout force.

SUMMARY

In one embodiment, there is provided a barb assembly for use with a cable duct component to oppose removal of a cable duct section from the cable duct component, the barb assembly comprising a barb comprising a body and one or more barb arms extending from the body to bitingly engage an end of a cable duct section and to oppose removal of a cable duct section from the cable duct component, and one or more barb arm supports.

In another embodiment, there is also provided a cable duct component that can receive an end of a cable duct section, the cable duct component comprising a barb assembly comprising a barb comprising a body and one or more barb arms extending from the body to bitingly engage an end of a cable duct section and to oppose removal of a cable duct section from the cable duct component, and one or more barb arm supports.

In another embodiment, there is also provided a cable duct component comprising a barb comprising a body and one or more barb arms extending from the body to bitingly engage an end of a cable duct section and to oppose removal of a cable duct section from the cable duct component, and one or more barb arm supports that can engage one of the barb arms to increase the ability of the barb assembly to oppose removal of the cable duct section from the cable duct component.

In another embodiment, there is also provided a cable duct system comprising a cable duct section comprising an end, and a cable duct component that can receive the end of the cable duct section, the cable duct component comprising a barb assembly, the barb assembly comprising a barb comprising a body and one or more barb arms extending from the body to bitingly engage the cable duct section and to oppose removal of the cable duct section from the cable duct component, and one or more barb arm supports.

In another embodiment, there is also provided a method for assembling a cable duct system, the method comprising providing a cable duct section comprising an end, providing a cable duct component that can receive the end of the cable duct section, the cable duct component comprising a barb assembly, the barb assembly comprising a barb comprising a body and one or more barb arms extending from the body to bitingly engage the end of the cable duct section and to oppose removal of the end of the cable duct section from the cable duct component, and one or more barb arm supports, and inserting the end of the cable duct section into the cable duct component.

BRIEF DESCRIPTION OF THE DRAWINGS

Embodiments of the present invention are described herein with reference to the drawings, in which.

DETAILED DESCRIPTION

The embodiments herein are directed to a new and improved barb assembly with a barb arm support. The barb assembly with the barb arm support can be used advantageously as part of another component, such as a cable duct coupler, for example, to engage and disengage one or more components of cable routing systems. The barb arm support can also be used advantageously with the various releasable barb assembly embodiments described and claimed in U.S. patent application Ser. No. 10/808,974, filed on Mar. 25, 2004, herein incorporated by reference in its entirety. Although several examples of particular embodiments are provided below, it should be understood that all the arrangements described herein are set forth for purposes of example only. As such, those skilled in the art will appreciate that other arrangements and other assemblies are contemplated as well.

Figure 1:
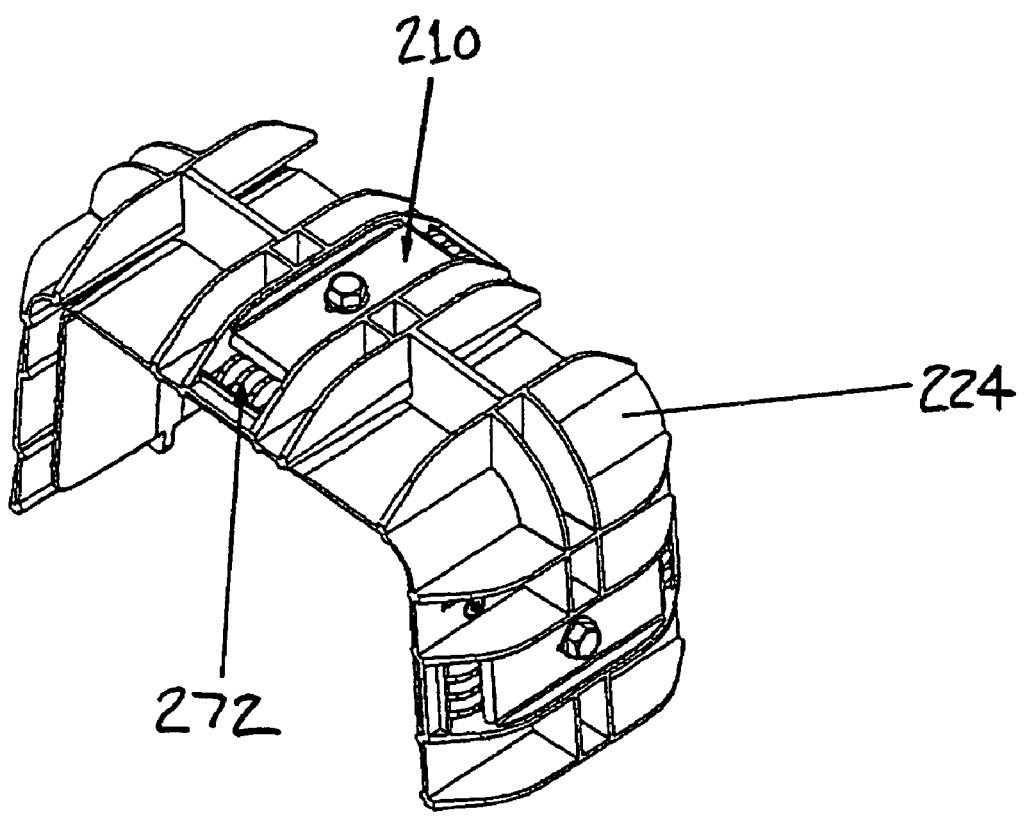
FIG. 1 depicts an isometric view of a cable duct component comprising a barb assembly with a barb arm support.
Figures 2, 2A:
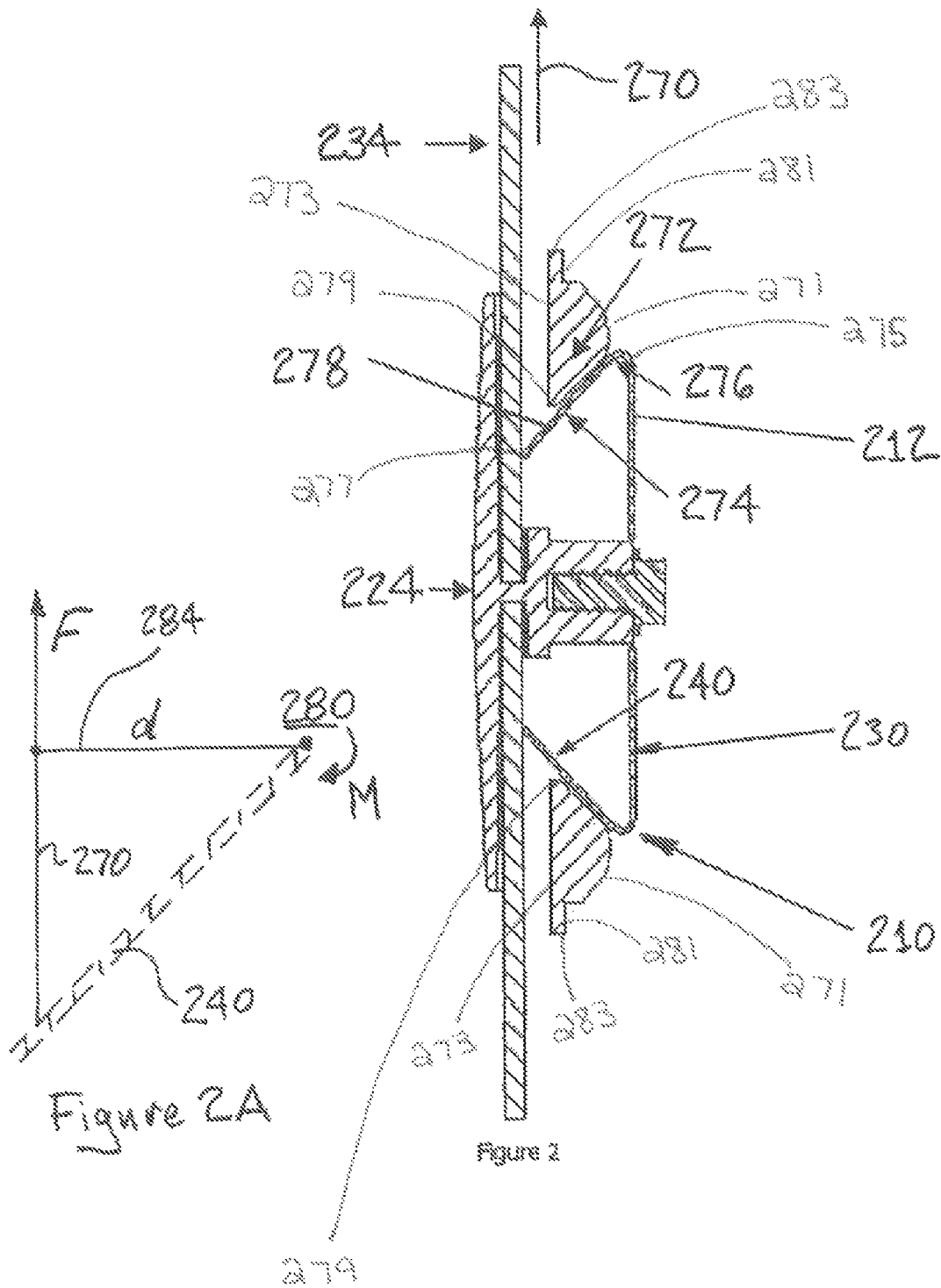
FIG. 2 depicts a cross-sectional view through a barb assembly and cable duct component.
FIG. 2A depicts a force diagram illustrating a barb arm support embodiment.
Figure 3:
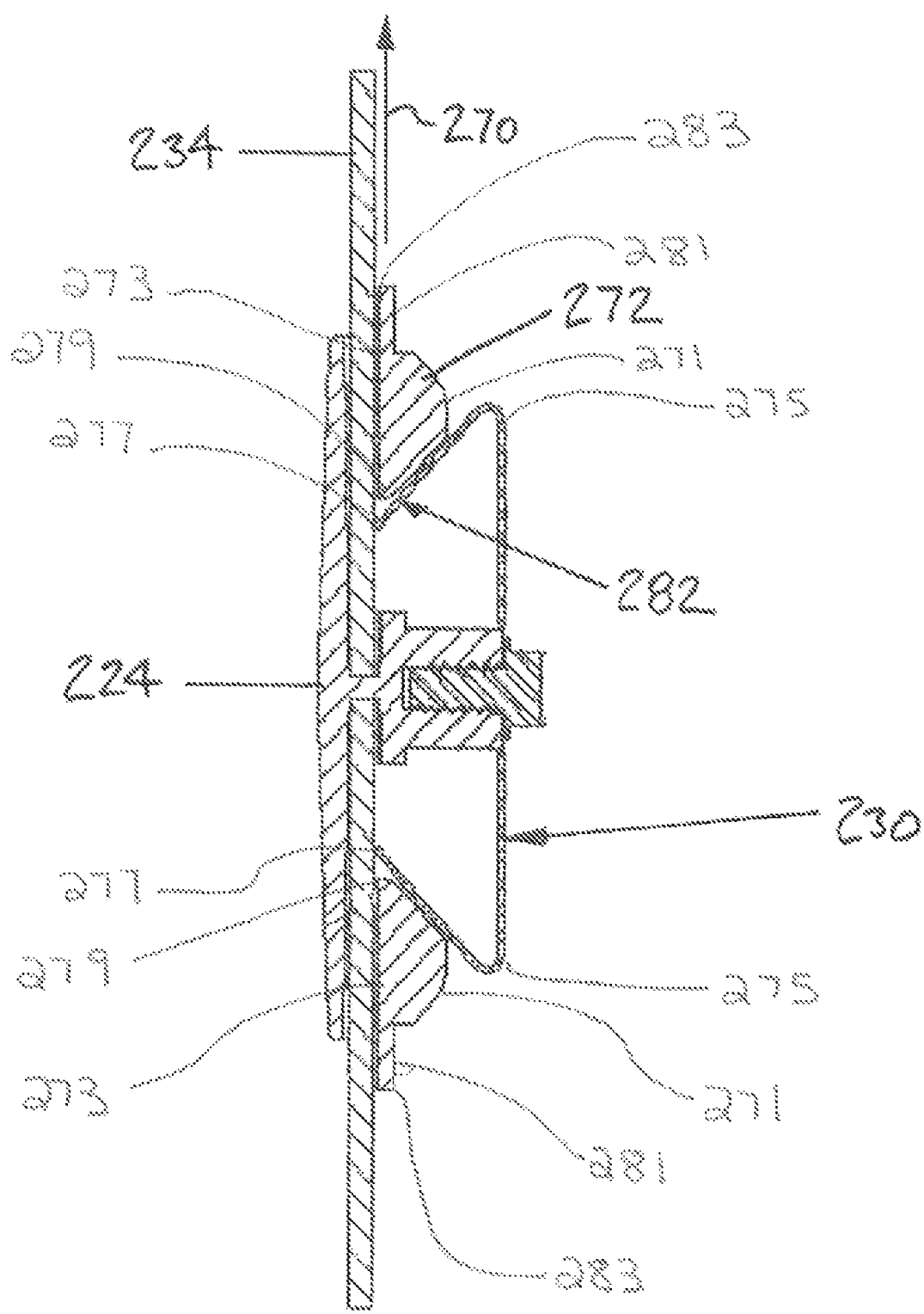
FIG. 3 depicts a cross-sectional view through an alternate barb arm support embodiment and cable duct component.

FIGS. 1-3 depict example embodiments of the barb assembly with barb arm support. FIG. 1 depicts a coupler 224 that can comprise one or more barb assemblies 210. As shown in the embodiment of FIG. 1, a coupler can also comprise one or more barb arm support structures 272. In one embodiment, the barb arm support structures 272 can be integral with the coupler 224. Other examples are possible as well. Moreover, cable duct components other than a coupler can comprise a barb assembly with barb arm support structures 272, such as a reducer fitting or a section of cable duct or raceway, for example.

FIG. 2 depicts the barb assembly 210 engaging one or more cable routing components 234, such as a section of cable duct or raceway, for example. In one embodiment, the barb assembly can include a barb 230 comprising a barb body portion 212 and one or more barb arms 240, which might be bent back relative to the barb body 212 at an angle greater than 90° and which might comprise an outer surface 278. FIG. 2 also depicts the barb arm support structures 272 engaging the outer surfaces 278 of the barb arms 240. In one embodiment, the barb assembly 210 can comprise two barb arms 240, and one barb arm support structure 272 can engage one of the barb arms 240 and another barb arm support structure 272 can engage the other barb arm 240. Other examples are possible as well.

Barb arm support structure 272 may take various forms. Referring to FIGS. 2 and 3, barb arm support structure 272 may comprise first curvilinear surface 271 and second surface 273. Curvilinear first surface 271 is typically positioned between bent portion 275 and terminal end 277 of barb arm 240. Curvilinear first surface 271 also abuts at least a portion of barb arm 240 and opposes movement of barb arm 240 when a pull-out force is applied to a cable duct section. First and second surfaces 271 and 273 may form first end portion 279, positioned near terminal end 277 of barb arm 240. Additionally, barb arm support structure 272 may comprise third surface 281 connected to first surface 271 and positioned parallel to second surface 273. Second and third surfaces 273 and 281 form second end portion 283 spaced apart from first end portion 279.

As depicted in the embodiment of FIG. 2, each barb arm 240 can bitingly engage a component 234 in the closed position. When a tensile "pullout" force (depicted by arrow 270) is then applied to one of the components 234, the barb arm 240 (which can have a serrated edge, for example) can penetrate into (or further into) the component 234 and/or can oppose movement of the component 234. The barb 230 can thus resist separation of the component 234 from the coupler 224.

Failure of a barb 230 might occur, however, if the tensile pullout force 270 is sufficient to overcome the ability of the barb 230 to resist that force. As depicted in the embodiment of FIG. 2A, the effect of the tensile pullout force 270 on the barb 230 can be measured as a product ("M") of the magnitude of the force 270 ("F") and the magnitude of a moment arm 284 ("d"), or as M=Fd, wherein the moment arm 284 is the perpendicular distance from the line of action of the force 270 to a point 280 about which the force 270 acts. Thus, assuming there is a particular magnitude of the moment M that defines the limit of the ability of the barb 230 to resist a tensile pullout force 270, decreasing the moment arm 284 can thereby advantageously increase the force 270 that the barb 230 can resist.

In one embodiment, each barb arm support structure 272 can support one of the barb arms 240 such that the support structure 272 can decrease the magnitude of the moment arm 284 and thereby increase the ability of the barb 230 to resist the tensile pullout force 270. The embodiment depicted in FIG. 2 includes two points, a first point 276 and a second point 274. An embodiment that does not include a barb arm support structure 272 will result in the tensile "pullout" force 270 acting about the point 276. An embodiment that includes the support structure 272 (as depicted in FIG. 25), will result in the tensile pullout force 270 acting about the point 274. Thus, in one embodiment, the barb arm support structure 272 can decrease the moment arm 284 (as depicted in FIG. 2A) by changing the point about which the tensile pullout force 270 acts, thereby advantageously increasing the tensile pullout force 270 that the barb 230 can resist.

FIG. 3 depicts an alternate embodiment of the barb arm support structure 272. In the embodiment of FIG. 3, the tensile pullout force 270 can act about a point 282. Thus, in the embodiment of FIG. 3, the magnitude of the moment arm 284 (as depicted in FIG. 2A) is further decreased from the magnitude of the moment arm 284 in the embodiment depicted in FIG. 2, thereby further increasing the ability of the barb 230 to resist the tensile pullout force 270.

In some embodiments, the barb arm support structure 272 can actually change the mode of failure of the barb assembly 210. For example, some placements or constructions of the barb arm support structure 272 could act to reduce the risk of failure of the barb 230 so much that the risk of failure shifts to other components of the barb assembly or cable duct system, such as the component 234, for example.

Several examples of particular embodiments of the present invention have been described above. Those skilled in the art will understand, however, that changes and modifications may be made to these embodiments without departing from the true scope and spirit of the present invention, which is defined by the claims.

We claim:

1. A barb assembly for coupling a first cable duct section to a second cable duct section, the barb assembly comprising:
   a barb comprising a body and at least one barb arm extending from a bent portion to a terminal end the barb arm bent back relative to the body at an angle of greater than 90°, the barb to engage at least one of the first and second cable duct sections: and
   at least one barb arm support comprising a surface positioned to contact a portion of the barb between the bent portion and the terminal end when a pull-out force is applied to at least one of the first and second cable duct sections, wherein the at least one barb arm support decreases a moment arm between a force resulting from an attempted removal of at least one of the first and second cable duct sections and a point about which the force acts.

2. The barb assembly of claim 1, wherein the at least one barb arm support engages the at least one barb arm to increase the ability of the barb assembly to oppose removal of at least one of the first and second cable duct sections.

3. The barb assembly of claim 1, wherein the barb arm support engages the at least one barb arm only upon attempted removal of at least one of the first and second cable duct sections.

4. The barb assembly of claim 1, wherein the at least one barb arm support is integral with a cable duct coupler used with the barb assembly, the cable duct coupler for coupling the first and second cable duct sections.

5. The barb assembly of claim 1, wherein the barb is adapted for use with at least one of a cable duct coupler, a cable duct reducer fitting and a raceway.

6. The barb assembly of claim 1, wherein the terminal end comprises a serrated edge.

7. A barb assembly for coupling a first cable duct section to a second cable duct section, the barb assembly comprising:
- a barb comprising a body and at least one barb arm bent back relative to the body at an angle of greater than 90° to engage at least one of the first and second cable duct sections: and
- a barb arm support comprising a first surface and a second surface, the first surface comprising a curvilinear surface positioned to engage the at least one barb arm to increase the ability of the barb assembly to oppose removal of the cable duct section from the cable duct component.

8. The barb assembly of claim 7, wherein the first and second surfaces form a first end portion positioned near a terminal end portion of the at least one barb arm.

9. The barb assembly of claim 7, wherein the curvilinear surface is positioned to oppose movement of the at least one barb arm when a pull-out force is applied to at least one of the first and second cable duct sections.

10. The barb assembly of claim 7, wherein the at least one barb arm support further comprises a third surface connected to the first surface, the third surface positioned in a parallel relationship to the second surface and forming a second end portion therewith, the second end portion spaced apart from the first end portion.

11. The barb assembly of claim 7, wherein the at least one barb arm support engages the at least one barb arm to increase the ability of the barb assembly to oppose removal of at least one of the first and second cable duct sections.

12. The barb assembly of claim 7, wherein the barb arm support engages the at least one barb arm only upon attempted removal of at least one of the first and second cable duct sections.

13. The barb assembly of claim 7, wherein a moment arm exists between a force resulting from an attempted removal of at least one of the first and second cable duct sections and a point about which the force acts and the barb arm support acts to decrease the moment arm.

14. The barb assembly of claim 7, wherein the curvilinear surface is positioned between a bent portion and a terminal end of the at least one barb arm.

15. The barb assembly of claim 7, wherein the barb is adapted for use with at least one of a cable duct coupler, a cable duct reducer fitting and a raceway.

16. The barb assembly of claim 7, wherein the terminal end comprises a serrated edge.

* * * * *

UNITED STATES PATENT AND TRADEMARK OFFICE
CERTIFICATE OF CORRECTION

PATENT NO. : 8,162,267 B2  
APPLICATION NO. : 10/970566  
DATED : April 24, 2012  
INVENTOR(S) : Dennis J. Waszak et al.

It is certified that error appears in the above-identified patent and that said Letters Patent is hereby corrected as shown below:

Column 4, line 43, which reads "from a bent portion to a terminal end the barb arm" should read "from a bent portion to a terminal end, the barb"

Column 4, line 46, which reads "cable duct sections: and" should read "cable duct sections; and"

Column 5, line 11, which reads "sections: and" should read "sections; and"

Signed and Sealed this  
Twelfth Day of March, 2013

Teresa Stanek Rea  
*Acting Director of the United States Patent and Trademark Office*